B. FORD.
STORAGE BATTERY PLATE.
APPLICATION FILED NOV. 24, 1920.

1,437,468.

Patented Dec. 5, 1922.
2 SHEETS—SHEET 1.

INVENTOR
Bruce Ford
BY
Augustus B. Stoughton
ATTORNEY.

WITNESS:
Rob't R. Kitchel.

B. FORD.
STORAGE BATTERY PLATE.
APPLICATION FILED NOV. 24, 1920.

1,437,468.

Patented Dec. 5, 1922.
2 SHEETS—SHEET 2.

WITNESS:
Rob. R. Kitchel

INVENTOR
Bruce Ford
BY
Augustus B Stoughton
ATTORNEY.

Patented Dec. 5, 1922.

1,437,468

UNITED STATES PATENT OFFICE.

BRUCE FORD, OF PHILADELPHIA, PENNSYLVANIA.

STORAGE-BATTERY PLATE.

Application filed November 24, 1920. Serial No. 426,276.

*To all whom it may concern:*

Be it known that I, BRUCE FORD, a citizen of the United States, residing at Philadelphia, in the county of Philadelphia and State of Pennsylvania, have invented certain new and useful Improvements in Storage-Battery Plates, of which the following is a specification.

The present invention is an improvement upon the grid and plate forming the subject-matter of my application, Serial No. 353,485, filed January 23rd, 1920, and its object is to still better accomplish the objects therein set forth and more especially to eliminate more of the grid material while retaining all the advantageous features. This result I accomplish by making the principal current carrying rods oblique and slanting in the direction of the lug which is arranged at the top edge of the plate and usually towards one margin or edge. In this way the current carrying path or paths is or are shortened so that the aggregate or total cross sectional area of the rods can be diminished while keeping the resistance substantially constant, because the resistance depends upon the length for the same cross section, or upon the cross section for the same length. These oblique rods are buried in the active material or material to become active and therefore do not cut down the active surface of the plate as would be the case if they extended to the plate surface.

The invention will be claimed at the end hereof but will be first described in connection with the accompanying drawings forming part hereof and in which—

Figure 1:
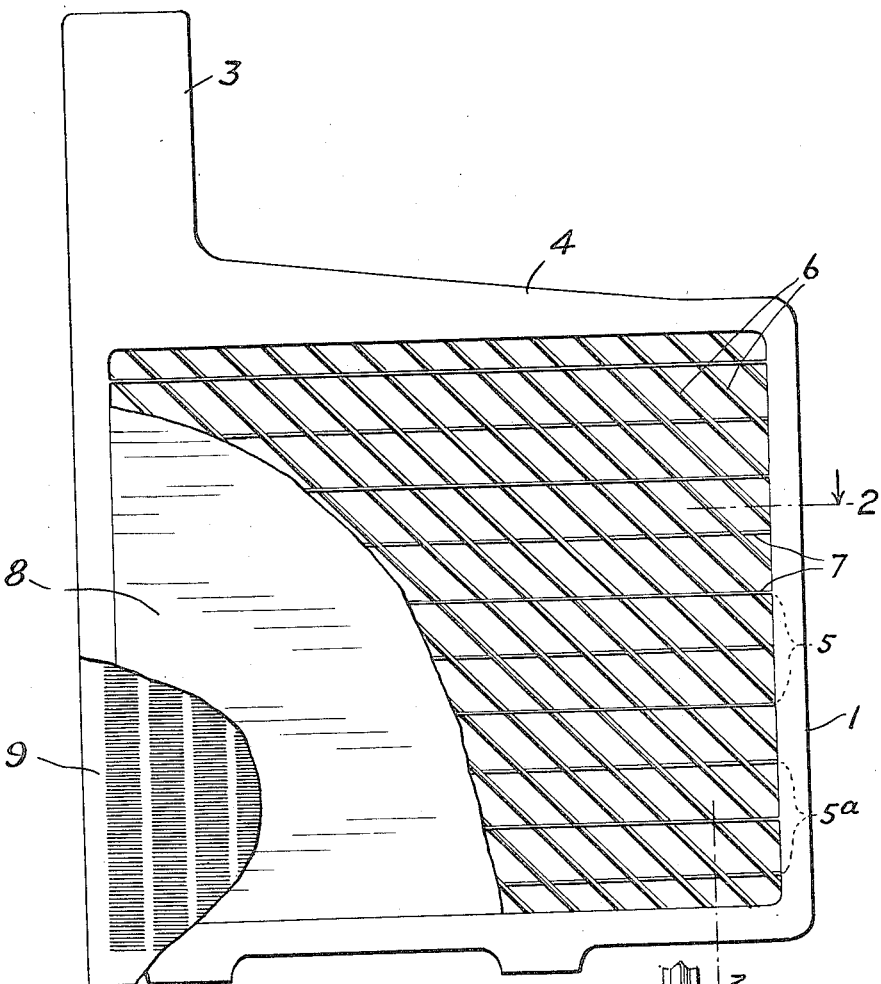
Figure 1, is a side view with parts broken away of a plate embodying features of the invention.
Figure 2:
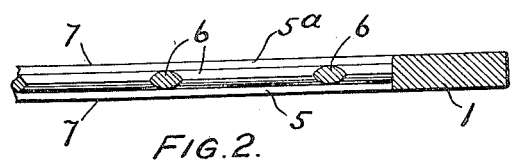
Figure 2, is a sectional view, drawn to an enlarged scale and taken on the line 2, of Figure 1, and showing some of the oblique bars.
Figure 3:
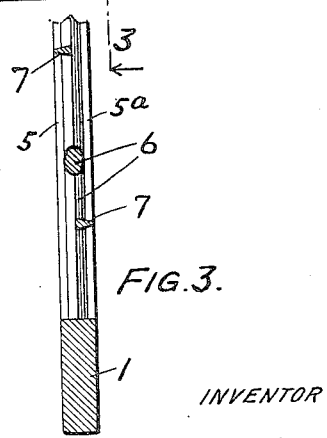
Figure 3, is a similar view taken on the line 3, of Figure 1, and showing some of the oblique bars.
Figure 4:
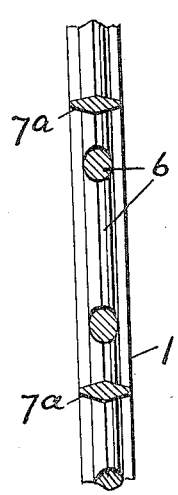
Figures 4 to 8, are views similar to Figure 3, and showing modifications.
Figure 5:
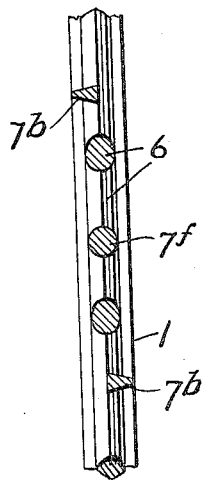
Figure 6:
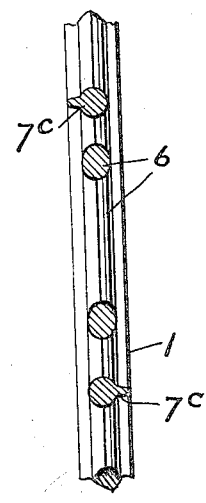
Figure 7:
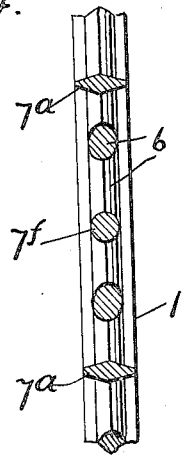
Figure 8:
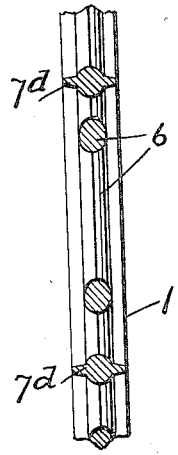

In the drawing 1 is a hollow rectangular marginal frame, shown as provided at its top and towards one edge with a lug 3, having a tapering extension 4, which provides good horizontal conductivity. This frame 1, surrounds a grillage provided with horizontal cavities 5 and $5^a$, which are continuous in that their surfaces are uninterrupted across the faces of the grillage. The grillage consists of oblique rods 6, slanting towards the lug 3, and shown as parallel and all confined to the median portion of the frame, and of horizontal tie-bars 7, $7^a$, $7^b$, $7^c$ and $7^d$, extending outwardly and terminating at the faces of the plate. As shown in Figures 5 and 7, additional tie-bars $7^f$, are provided and as shown they do not extend to the surfaces of the plate. The tie bars may be of less cross section than the rods 6, and in a square plate they are preferably not so numerous as the rods. This provides for a large active surface, because the major portions of the grillage including the rods 6, are buried in the active material or material to become active and only the edges of the tie-bars 7, appear at the faces. The active material 8, is arranged in the horizontal cavities 5 and $5^a$.

Figure 9:
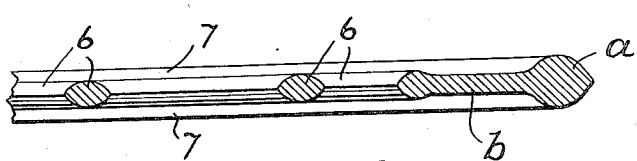
Figure 9, is a horizontal sectional view illustrating a modification in the cross section of the marginal frame of the grid.

In Figure 9, the marginal frame of the grid is shown as provided with a marginal bead $a$, and an inwardly projecting web $b$. The bead $a$, is of substantially the thickness of the plate and the web $b$, is thinner. The active material thereby has an increased surface and protects the web covered by it. In the construction shown the tie-bars 7, extend across the web to the bead, and the cavities for active material or material to become active therefore extend across the webs of the sides of the frame to the bead.

From the foregoing description it is evident that the active surface is large and that the quantity of active material may also be large, since the amount of metal in the grillage may be relatively small.

The comparatively numerous oblique rods 6, being buried, do not diminish the active surface, but they provide good conductivity with comparatively little weight, because being inclined towards the lug, the total current path is relatively short and therefore may be of comparatively small aggregate cross section while keeping the resistance sufficiently low. For a square plate the inclination of the rods may well be approximately 45°. 9, is a separator or retainer of any of the types successfully used for this purpose. As shown it consists of a horizontally slotted sheet of rubber or rubber material.

It will be obvious to those skilled in the art to which the invention relates that modifications can be made in details of construction and arrangement without departing from the spirit of the invention, hence the latter is not limited as to such matters or otherwise than as the prior art and the appended claims may require.

I claim:

1. A grid for storage battery plates comprising in combination, a rectangular marginal frame provided with a lug and surrounding a unitary grillage consisting of oblique rods slanting towards the lug and all confined to the median portion between the faces, and horizontal tie bars extending outwards to the opposite faces and providing horizontal and facially uninterrupted cavities extending entirely across the grillage between said horizontal tie bars and terminating at the marginal frame.

2. In a storage battery plate the combination of a unitary grillage provided with a marginal terminal and consisting of horizontal bars flush with the faces of the grillage and of oblique rods slanting towards the terminal and arranged in the median portion, and active material in which the oblique rods are buried and which presents an unbroken surface across the grillage between the horizontal bars, substantially as described.

3. A grid for storage battery plates comprising in combination, a rectangular marginal frame provided with a lug and surrounding a unitary grillage consisting of oblique rods slanting towards the lug and arranged in the median portion between the faces, and bars extending outwards to the opposite faces and providing facial cavities between said bars.

4. In a storage battery plate the combination of a unitary grillage provided with a marginal terminal and consisting of bars flush with the faces of the grillage and of oblique rods slanting towards the terminal, and active material, in which the oblique rods are buried, substantially as described.

5. In a storage battery plate the combination of a unitary grillage provided with a marginal terminal and consisting of bars flush with the faces of the grillage and of oblique rods slanting toward the terminal, the aggregate cross-sectional area of the rods substantially exceeding the aggregate cross-sectional area of the bars, and active material in which the oblique rods are buried and of which the exposed surface is increased to the extent that it covers the rods and is not displaced by the bars.

6. In a storage battery plate the combination of a unitary grillage provided with a marginal terminal and consisting of bars flush with the faces of the grillage and of oblique rods slanting toward the terminal, the aggregate cross-sectional area and number of the rods substantially exceeding the aggregate cross-sectional area and number of the bars, and active material in which the oblique rods are buried and of which the exposed surface is increased to the extent that it covers the rods and is not displaced by the bars.

BRUCE FORD.